(12) United States Patent
Jakkula et al.

(10) Patent No.: US 11,372,818 B2
(45) Date of Patent: Jun. 28, 2022

(54) SCALING PERFORMANCE FOR LARGE SCALE REPLICA SETS FOR A STRONGLY CONSISTENT DISTRIBUTED SYSTEM

(71) Applicant: Samsung Electronics Co., Ltd., Suwon-si (KR)

(72) Inventors: Vijaya Kumar Jakkula, San Jose, CA (US); Venkata Bhanu Prakash Gollapudi, Pleasanton, CA (US)

(73) Assignee: SAMSUNG ELECTRONICS CO., LTD.

( * ) Notice: Subject to any disclaimer, the term of this patent is extended or adjusted under 35 U.S.C. 154(b) by 117 days.

(21) Appl. No.: 16/812,255

(22) Filed: Mar. 6, 2020

(65) Prior Publication Data

US 2021/0209066 A1 Jul. 8, 2021

Related U.S. Application Data

(60) Provisional application No. 62/958,306, filed on Jan. 7, 2020.

(51) Int. Cl.
*G06F 16/178* (2019.01)
*G06F 13/42* (2006.01)

(52) U.S. Cl.
CPC ........ *G06F 16/178* (2019.01); *G06F 13/4204* (2013.01)

(58) Field of Classification Search
USPC ........................................................ 707/610
See application file for complete search history.

(56) References Cited

U.S. PATENT DOCUMENTS

| | | | | |
|---|---|---|---|---|
| 6,163,855 A | * | 12/2000 | Shrivastava | G06F 11/1443 709/208 |
| 6,401,120 B1 | * | 6/2002 | Gamache | G06F 11/1482 709/220 |
| 7,120,821 B1 | * | 10/2006 | Skinner | H04L 67/1008 714/4.4 |
| 9,799,017 B1 | * | 10/2017 | Vermeulen | G06F 16/25 |
| 2002/0161889 A1 | | 10/2002 | Gamache et al. | |
| 2006/0090095 A1 | * | 4/2006 | Massa | G06F 11/182 714/4.11 |
| 2007/0073855 A1 | * | 3/2007 | Joshi | H04L 67/306 709/223 |
| 2007/0078911 A1 | * | 4/2007 | Lee | G06F 16/27 |
| 2008/0155310 A1 | * | 6/2008 | Langen | H04L 65/1006 714/6.12 |

(Continued)

*Primary Examiner* — Cam Linh T Nguyen
(74) *Attorney, Agent, or Firm* — Renaissance IP Law Group LLP (57) ABSTRACT

A system and a method are disclosed that provides a data replication management technique for a distributed environment that eliminates a need to order members of a replica set. A node of a node cluster in the distributed system may be configured to send in parallel an IO request to each respective member of the replica set. Reponses are received from members of the replica set that indicate a completion status of the IO request at the replica set member sending the IO response. A request is sent to other nodes of the node cluster to remove a replica from the replica set based on an error response received from the replica. The replica that responded with the error response is removed from the replica set based on an agreement of nodes of the node cluster to remove the replica from the replica set.

17 Claims, 5 Drawing Sheets

(56) References Cited

U.S. PATENT DOCUMENTS

| | | |
|---|---|---|
| 2009/0313311 A1 | 12/2009 | Hoffmann et al. |
| 2011/0072206 A1* | 3/2011 | Ross .................... G06F 3/0604 |
| | | 711/108 |
| 2012/0166390 A1 | 6/2012 | Merriman et al. |
| 2015/0301901 A1 | 10/2015 | Rath et al. |
| 2016/0070740 A1* | 3/2016 | Vermeulen .......... G06F 16/2322 |
| | | 707/703 |
| 2016/0092540 A1* | 3/2016 | Bihani ................. G06F 16/256 |
| | | 707/624 |
| 2016/0364158 A1* | 12/2016 | Narayanan ............. G06F 3/067 |
| 2017/0032007 A1 | 2/2017 | Merriman |
| 2018/0314706 A1* | 11/2018 | Sirton ................. G06F 16/2365 |
| 2019/0266057 A1* | 8/2019 | Dalal ................. G06F 16/2365 |

* cited by examiner

SCALING PERFORMANCE FOR LARGE SCALE REPLICA SETS FOR A STRONGLY CONSISTENT DISTRIBUTED SYSTEM

CROSS-REFERENCE IO RELATED APPLICATION

This application claims the priority benefit under 35 U.S.C. § 119(e) of U.S. Provisional Application No. 62/958,306, filed on Jan. 7, 2020, the disclosure of which is incorporated herein by reference in its entirety.

TECHNICAL FIELD

The subject matter disclosed herein relates to a distributed system. More specifically, the subject matter disclosed herein relates to a system and a method that provides a management technique for data replication in a distributed environment that eliminates a need to order members in a replica set.

BACKGROUND

A distributed object store achieves performance, scalability and data resiliency through replication and balanced data distribution in an underlying cluster. A distributed system, however, is subject to failures of individual components of the distributed system. For example, a node or a media failure may be an individual component that may fail in a distributed system. During a component failure, situations, such as data unavailability and data loss, may be avoided through synchronous data replication within the distributed system.

Data replication may be performed by configuring a replica set. For example, a set of data stores may be configured as a replica set. An input/output (IO) request issued to a replica set may be replicated across all the members in the replica set. The replication may use mirroring or other storage efficient methods, such as erasure coding.

In spite of data replication in a distributed environment, recovering from a failure may present a challenge for determining which replica is the correct copy or which set of copies in the replica set may be used for recovery. The challenge of data recovery may be further complicated with scale as the number of nodes in a distributed system increases and/or the size of a replica set increases.

SUMMARY

An example embodiment provides a distributed system that may include a plurality of object stores and a plurality of nodes in a node cluster. Each node of the node cluster may be communicatively coupled to the plurality of object stores. A selected node of the node cluster may be configured to: send in parallel an IO request to each respective member of a replica set in which the replica set may include a plurality of unordered members stored on the plurality of object stores; receive IO responses from members of the replica set in which each received IO response may indicate a completion status of the IO request at a member of the replica set sending the IO response; send a request to other nodes of the node cluster to remove a replica from the replica set based on an error response received from the replica for the IO request; and remove the replica that responded with the error response from the replica set based on an agreement of nodes of the node cluster to remove the replica that responded with the error response from the replica set. In one embodiment, in response to the request sent by the selected node to the other nodes of the node cluster, the other nodes of the node cluster may each send a test IO operation to the members of the replica set, and may each send to the selected node a message that provides an indication of an outcome of the test IO operation.

An example embodiment provides a distributed system that may include a plurality of object stores and a plurality of nodes in a node cluster. Each node of the node cluster may be communicatively coupled to the plurality of object stores. A selected node of the node cluster may be configured to: receive an input/output (IO) request from an application to modify data in a replica set stored in the plurality of object stores in which the replica set may include a plurality of unordered members stored on the plurality of object stores; send in parallel the IO request to each respective member of the replica set; receive IO responses from members of the replica set in which each received IO response indicating a completion status of the IO request at member of the replica set sending the IO response; determine whether all of the members of the replica set have responded with an indication of successful completion of the IO request; send an IO response to the application indicating successful completion of the IO request based on all of the members of the replica set responding with an indication of successful completion of the IO request; send a request to other nodes of the node cluster to remove a replica from the replica set based on an error response received from the replica for the IO request; and remove the replica that responded with the error response from the replica set based on an agreement of nodes of the node cluster to remove the replica that responded with the error response from the replica set.

An example embodiment provides a method for managing replica consistency in a distributed system in which the method may include: receiving, at a first node in the distributed system, an input/output (IO) request from an application to modify data in a replica set in which the replica set may include a plurality of unordered members; sending in parallel, by the first node, the IO request to each respective member of the replica set; receiving, at the first node, IO responses from members of the replica set in which each received IO response may indicate a completion status of the IO request at the member of the replica set sending the IO response; determining, at the first node, whether all of the members of the replica set have responded with an indication of successful completion of the IO request; sending, by the first node, an IO response to the application indicating successful completion of the IO request based on determining that all of the members of the replica set responded with an indication of successful completion of the IO request; sending, by the first node, a request to other nodes of a node cluster to which the first node belongs to remove a replica from the replica set based on an error response received from the replica for the IO request; and removing, at the first node, from the replica set the replica that responded with the error response based on an agreement of nodes of the node cluster to remove the replica that responded with the error response from the replica set.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a technique for data replication in a distributed environment that eliminates a need to order members in a replica set. Any member of the replica set surviving after a component failure event may be used as a master copy to recover data. The subject matter disclosed herein leverages an IO completion response from each replica in the replica set as an implicit vote in an IO request, making the IO request an implicit transaction driven by the node issuing the IO. Completion responses received from the different replicas of the replica set may be treated as votes for continued membership of a data store in a replica set.

Traditionally, data recovery of a replica set has been handled by different mechanisms, such as an ordering among the copies of the replica set; and/or a distributed transaction and consensus mechanism that may be used, such as a two-phase commit mechanism. A traditional ordering approach in a replica set works by ordering the members of the replica set so that the IO requests are written in a certain order among the members of the replica set. The ordering among the replicas in the set helps a distributed system have a consistent view to determine the copy or copies of the replica that may be used as a master copy for data recovery. An ordering mechanism, nevertheless, creates a predetermined master copy in the replica set.

Figure 1A:
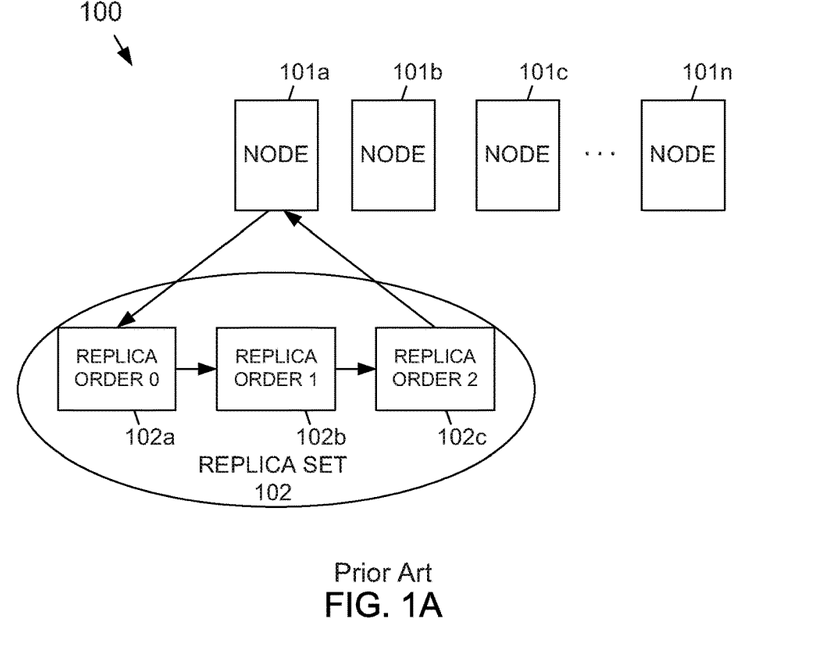
FIG. 1A pictorially depicts a traditional ordering mechanism of copies of a replica set in a distributed system in ensure data consistency among the different replicas in the set.

FIG. 1A pictorially depicts a traditional ordering mechanism of copies of a replica set in a distributed system 100 in ensure data consistency among the different replicas in the set. The distributed system 100 includes a plurality of nodes 101a-101n. A replica set 102 may include three replicas 102a-102c. In one embodiment, the replica set 102 may include more than three replicas. The node 101a may receive an IO request from an application (not shown) that is communicatively coupled to the node 101a. In response, the node 101a sends the IO request to the replica 102a, which is the first replica in the ordered replica set. The ordering is that the replica 102a has an order of 0 (i.e., the first replica), the replica 102b has an order of 1, and the replica 102c has the order of 2. The replica 102a completes the IO request, and then the IO request to the replica 102b, which the second replica in the ordered replica set. The replica 102b completes the IO request, and sends the IO request to the replica 102c, which is the third replica in the ordered set. Upon completion of the IO request, the replica 102c sends an IO completion response to the node 101a. The node 101a sends an IO completion (not shown) response to the application.

Figure 1B:
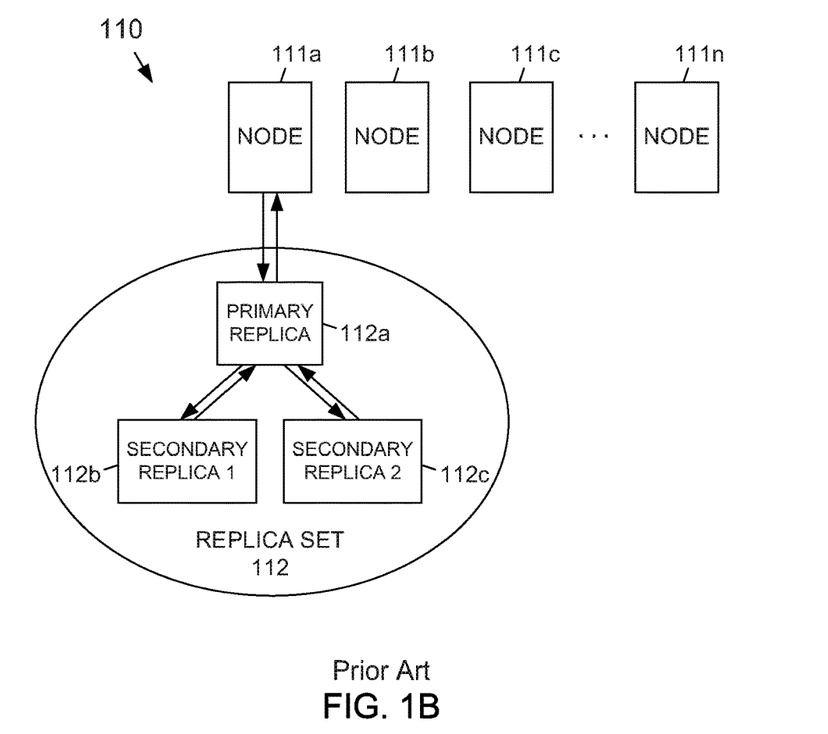
FIG. 1B pictorially depicts a traditional distributed transaction and consensus mechanism used in a distributed system in ensure data consistency among the different replicas in a replica set.

A traditional distributed transaction and consensus mechanism, such as a two-phase commit mechanism, introduces additional handshakes between the different nodes involved in a transaction. The cost of the ordering approach includes a performance penalty caused by the serialization that must occur whenever data is committed to the replica set. The serialization results in hotspots on the replica set because all IOs follow the same pattern to write data. The hotspots occur at components in the distributed system that are subjected to higher IO traffic that corresponding peers in the system. The performance penalty impact of the serialization increases with scale, i.e., the size of the distributed system and of the replica set. A cost of a distributed transaction and consensus mechanism, like two-phase commit mechanism, is in a performance penalty because additional handshakes between the nodes are introduced. The system may have to deal with complicated error scenarios of node failures in between the distributed transaction and consensus mechanisms. FIG. 1B pictorially depicts a traditional distributed transaction and consensus mechanism used in a distributed system 110 in ensure data consistency among the different replicas in a replica set. The distributed system 110 includes a plurality of nodes 111a-111n. A replica set 112 may include a primary replica 112a and secondary replicas 112b and 112c. In one embodiment, the replica set 112 may include more than two secondary replicas. The node 111a may receive an IO request from an application (not shown) that is communicatively coupled to the node 111a. In response, the node 111a sends the IO request to the primary replica 112a, which in turn, sends the IO request to the secondary replicas 112b and 112c. Both the secondary replicas 112b and 112c send a completion response to the primary replica 112a when the IO request has been completed. The primary replica 112a collects the completion responses from the secondary replicas 112b and 112c, and then sends a consensus-based completion response to the node 111a. The node 111a then sends a completion response (not shown) to the application.

Figure 2:
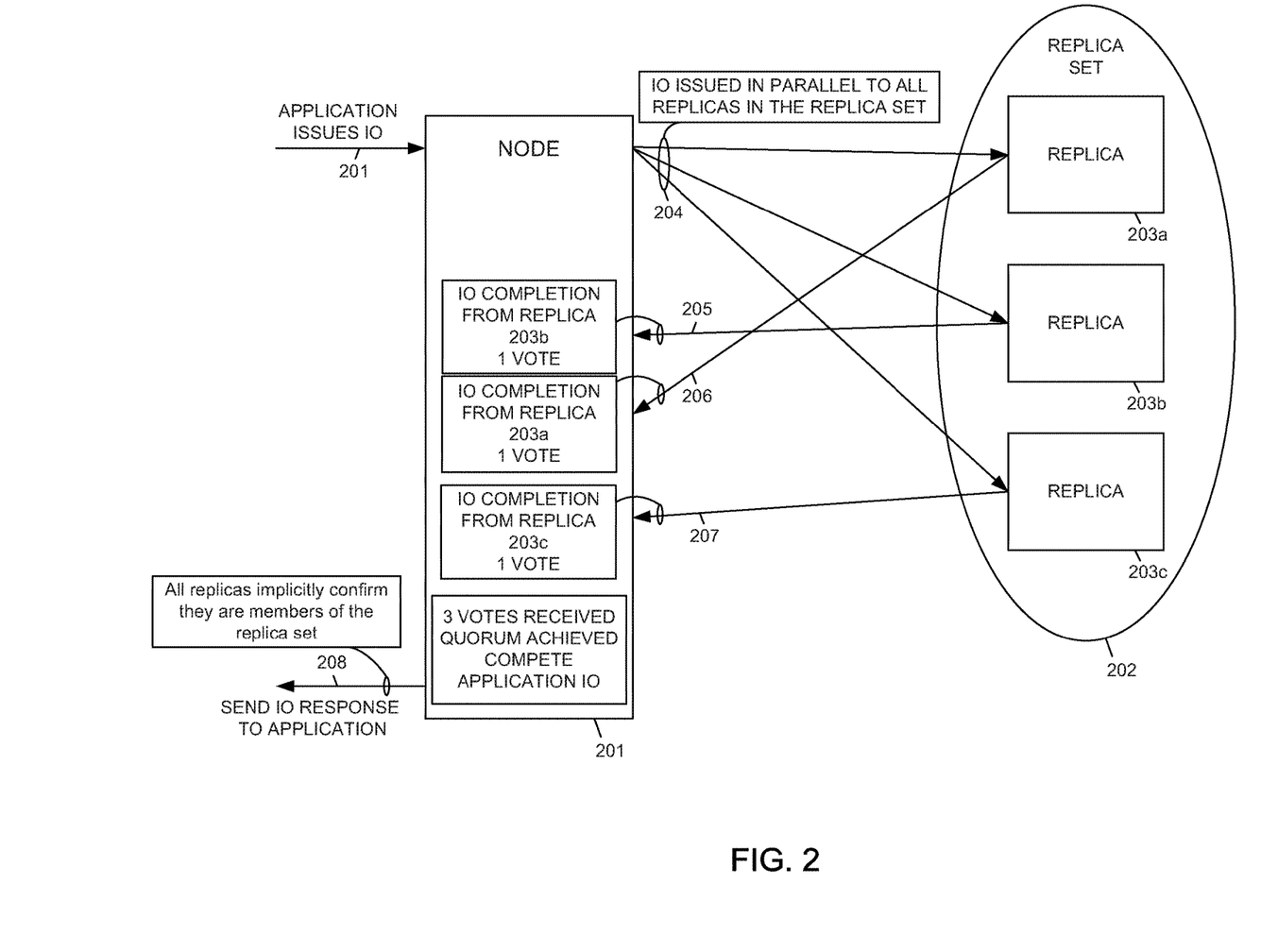
FIG. 2 pictorially depicts an example sequence of a technique of data replication management in a distributed system that recovers data after a component failure event according to the subject matter disclosed herein.

FIG. 2 pictorially depicts an example sequence of a technique of data replication management in a distributed system that recovers data after a component failure event according to the subject matter disclosed herein. In FIG. 2, an example node 200 in the distributed system receives an IO transaction at 201 from an application (not shown) that is communicatively coupled to at least the node 200 of the distributed system. The node 200 may be one of multiple nodes (not shown) in the distributed system. Additionally, the node 200 may be part of a node cluster (not shown).

The received IO request may modify or read data of a replica set 202 that may include a plurality of unordered members 203. The replica set 202 may include, for example, three unordered members 203a-203c. In another embodiment, the replica set may include any number of unordered members.

In response to the received IO request, the node 200 sends in parallel the IO transaction to each of the members of the replica set at 204. At 205, the replica member 203b responds with an IO response message indicating that the IO request has been completed successfully. At 206, the replica member 203a responds with an IO response message indicating that the IO request has been successfully completed. At 207, the replica member 203c responds with an IO response message indicating that the IO request has been successfully completed.

Each successful IO response message that is received by the node 200 may be considered to be a vote, or a tally, that indicates that the particular replica member sending the IO response message is still an active member of the replica set 202. In this example, a successful IO response message was received from all three replica member 203a-203c. At 208, the node 202 sends an IO response message to the application indicating that the IO transaction has successfully completed.

Figure 3:
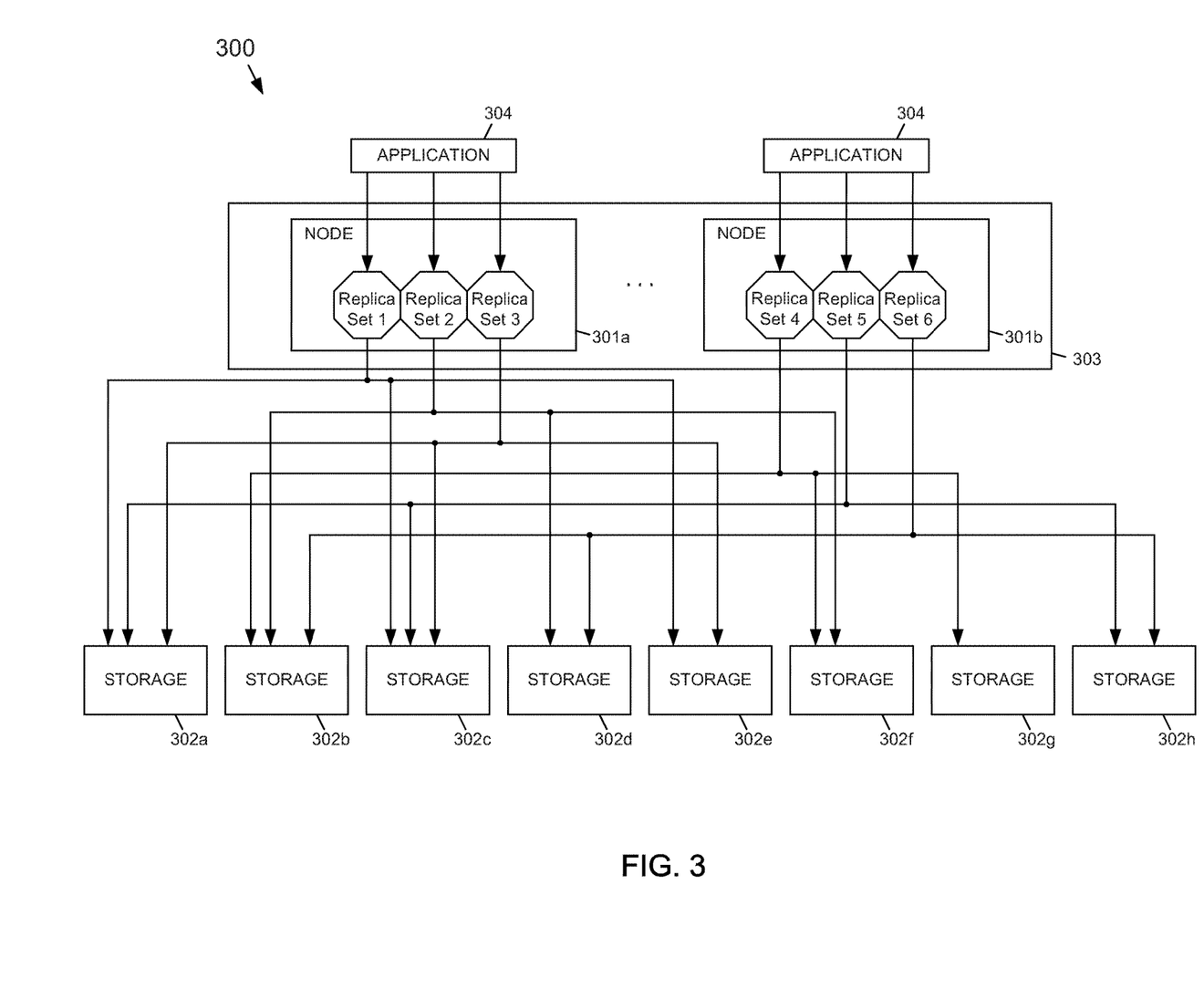
FIG. 3 depicts the parallelism provided by the data replication management technique for a distributed system disclosed herein.

FIG. 3 depicts the parallelism provided by the data replication management technique for a distributed system disclosed herein. In FIG. 3, a distributed system 300 may include a plurality of nodes 301, and a plurality of storage devices 302. The nodes 301a and 301b may be part of a node cluster 303. Although only nodes 301a and 301b are depicted, it will be understood that the distributed system 300 may include any number of nodes, and that any number of nodes 301 may be part of a node cluster 303. Additionally, it will be understood that the distributed system 300 may include any number of storage devices 302.

In the example distributed system 300 depicted in FIG. 3, each node 301a and 301b is configured to be a primary manager of three replica sets. In particular, the node 301a may be configured to manage replica sets 1-3, and the node 301b may be configured to manage replica sets 4-6. Each respective replica 1-6 may include a plurality of unordered replica members. The unordered members of each replica set and the data for each respective member of each replica set may be stored anywhere on the storage devices 302. For example, the replica set 1 may have data stored on the storage devices 302a, 302c and 302e. The replica set 2 may have data stored on the storage device 302b, 302d and 302f, and so on. Examples of where particular members of a replica set are not indicated in FIG. 3 for clarity.

A node 301 that receives an IO request from an application 304 for a particular replica set issues parallel independent IO requests to each member of the replica set, thereby allowing a large replica to be seamlessly supported. Different nodes 301 in the distributed system 300 may be allowed to issue IO requests to all the member replicas in a replica set without causing one of the member replicas to become a hotspot replica. Any necessity to have ordering between replicas of a replica set for data recovery has been eliminated, thereby simplifying recovery in a case of a failed component and/or a failed replica in the replica set because any surviving member of the replica set may each be considered as a master copy.

The data replication management technique for a distributed system disclosed herein may include the following operations. A node 301 in the distributed system 300 may issue in parallel an IO request to each member of a replica set. Each member of the replica set receives and processes the IO request independently. If the IO request has been processed successfully, the replica member sends a successful completion response to the node 301 that issued the IO request. The node 301 that issued the IO request counts the successful completion responses from the members of the replica set as a vote. A successful IO completion response from a member in the replica set may be considered as an indication that the member is still an active member of the replica set. The node 301 then sends an IO response to the application 304 only after the node 301 receives votes from all members of the replica set. The acknowledgement to the application 304 indicates that the data has been committed and is protected against the loss of one or more replicas in the replica set.

Figure 4A:
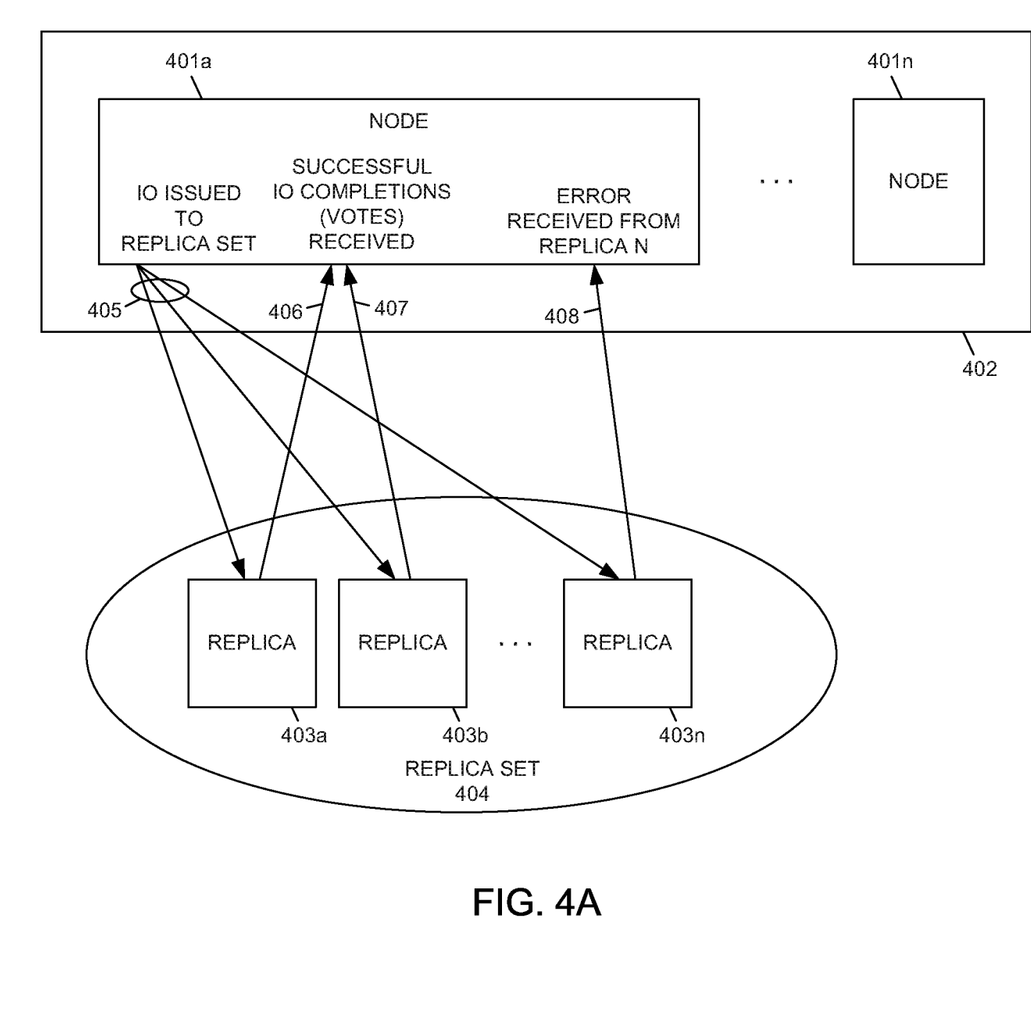
FIG. 4A pictorially depicts a node of a node cluster sending an IO request to a plurality of replicas of a replica set in which a replica returns an IO response indicating an error for the IO request according to the subject matter disclosed herein.

A replica set membership change may be triggered in case of IO failure. FIG. 4A pictorially depicts a node 401 of a node cluster 402 sending an IO request to a plurality of replicas 403 of a replica set 404 in which a replica returns an IO response indicating an error for the IO request according to the subject matter disclosed herein. At 405, a node 401a of the node cluster 402 sends an IO request in parallel to the members 403a-403n of the replica set 404. At 406 and 407, representative replicas 403a and 403b return an IO response indicating a successful completion of the IO request. At 408, a replica 403n returns an IO response indicating an error for the IO request.

Figure 4B:
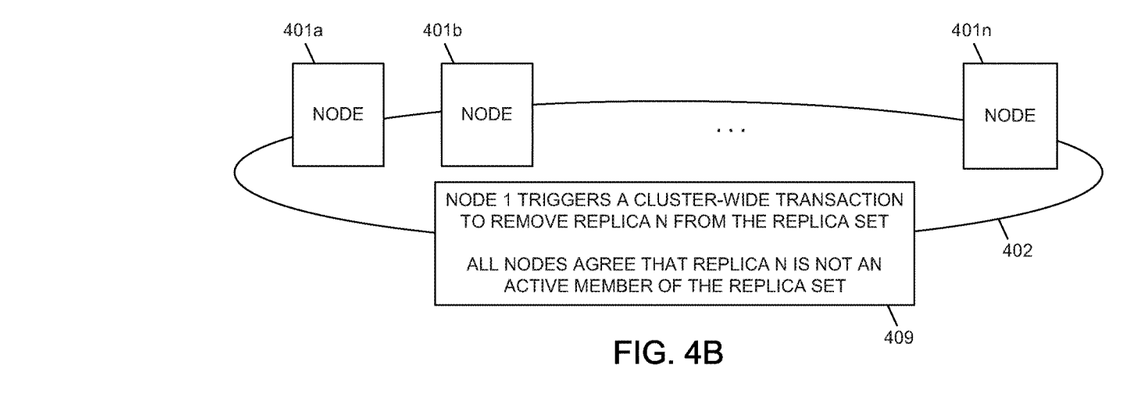
FIG. 4B pictorially depicts a node sending a request to other nodes in a cluster to determine whether a particular replica is not a good replica.

In response to the node 401a receiving the IO response from the replica 403n indicating an error for the IO request, a cluster-wide operation may be initiated to determine the current active membership of the replica set 404. In one embodiment, the node 401a sends a request at 409 to other nodes in the cluster 402 to determine whether the particular replica is not a good replica as depicted in FIG. 4B. In one embodiment, the other nodes in the cluster 402 may, for example, perform a test IO operation of the replica set to check the integrity of the members of the replica set 404, and send a message to the node 401a that agrees with or disagrees with the node 401a based on an outcome of the test IO operation.

Figure 4C:
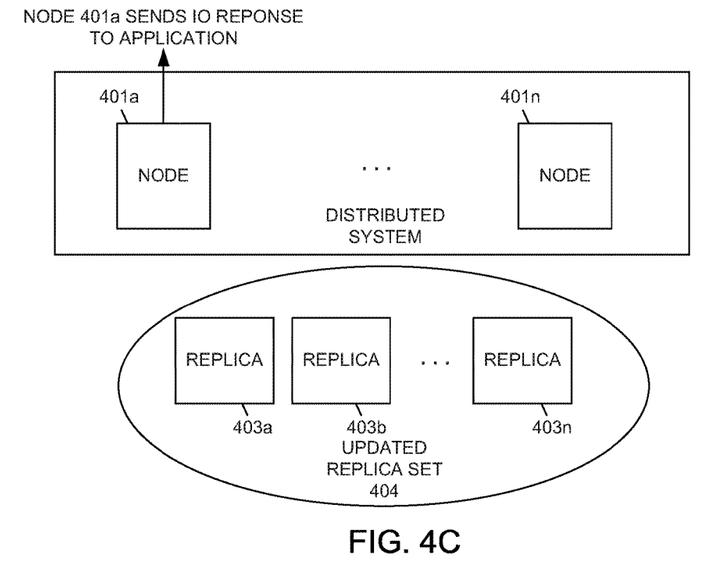
FIG. 4C pictorially depicts a node in a node cluster that updates membership of a replica set by removing a replica from the replica set.

Based on the outcome of the cluster-wide operation, one of two actions may occur. As a first action, all nodes 401 in the node cluster 402 agree that the replica 403n is no longer a member of the replica set 404. Each node 401 in the node cluster 402 may update the membership of the replica set by removing the replica 403n from the replica set, as depicted in FIG. 4C. After this has been done, the node 401a completes the IO by sending a successful completion message to the application that originated the IO request.

As a second action, if all of the other nodes 401 in the node cluster 402 confirm that the replica 303n in the replica set 404 is good, then the node 401a has one of two choices. The node 401a may remove itself from the cluster 402, or may cause all the IOs issued to that replica set from the node 401 to be failed.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions recited in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A distributed system, comprising:
a first object store;
a second object store; and
a node cluster comprising a first node and a second node, wherein the first node and the second node are communicatively coupled to the first and second object stores, and wherein the first node of the node cluster is configured to:
send a first IO request to a first member of a replica set and a second IO request to a second member of the replica set, the replica set comprising a first unordered member and a second unordered member stored on at least one of the first and second object stores;
receive a first IO response from the first member of the replica set indicating a completion status of the first IO request and a second IO response from the second member of the replica set indicating a completion status of the second IO request;
send a request to the second node of the node cluster to modify the replica set based on an error response received from the first member of the replica set for the first IO request; and
modify the replica set based on an agreement of the first and second nodes of the node cluster.

2. The distributed system of claim 1, wherein based on the request sent by the first node to the second node, the second node sends a test IO operation to the first and second members of the replica set, and the first and second members send to the first node a message that provides an indication of an outcome of the test IO operation.

3. The distributed system of claim 1, wherein the first node is further configured to modify the node cluster based on the first node receiving from the second node of the node cluster an indication that the first member of the replica set is a good replica.

4. The distributed system of claim 1, wherein the first node is further configured to fail one or more IOs sent to the first member of the replica set.

5. The distributed system of claim 1, wherein one or more members of the replica set with a successful indication based on the IO request comprise one or more active members of the replica set, and
wherein the first node is further configured to select an active member of the replica set as a master copy of the replica set based on a component failure of the distributed system.

6. The distributed system of claim 1, wherein the first node is further configured to determine the successful completion of the IO request by one or more members of the replica set.

7. A distributed system, comprising:
a first object store
a second object store; and
a node cluster comprising a first node and a second node, wherein the first node and the second node are communicatively coupled to the first and second object stores, and wherein the first node of the node cluster is configured to:
receive an input/output (IO) request from an application to modify data in a replica set stored in at least one of the first and second object stores, the replica set comprising a first unordered member and a second unordered member stored on at least one of the first and second object stores;
send the IO request to the first and second members of the replica set;
receive IO responses from the first and second members of the replica set, a received IO response indicating a completion status of the IO request at the member of the replica set sending the IO response;
determine a successful completion of the IO request by the first and second members of the replica set;
send an IO response to the application indicating successful completion of the IO request based on the first and second members of the replica set responding with an indication of successful completion of the IO request;
send a request to the second node of the node cluster to modify the replica set based on an error response received from the first member for the IO request; and
modify the replica set based on an agreement of the first and second nodes of the node cluster.

8. The distributed system of claim 7, wherein based on the request sent by the first node to the second node of the node cluster, the second node of the node cluster sends a test IO operation to the first and second members of the replica set, and send to the first node a message based on an outcome of the test IO operation.

9. The distributed system of claim 7, wherein the first node is further configured to modify the node cluster based on the first node receiving from the second node of the node cluster an indication that the first member of the replica set is a good replica.

10. The distributed system of claim 7, wherein the first node is further configured to fail one or more IOs sent to the first member of the replica set.

11. The distributed system of claim 7, wherein one or more members of the replica set with a successful indication based on the IO request comprise one or more active members of the replica set, and
wherein the first node is further configured to select an active member of the replica set as a master copy of the replica set based on a component failure of the distributed system.

12. A method for managing replica consistency in a distributed system, the method comprising:
receiving, at a first node in the distributed system, an input/output (IO) request from an application to modify data in a replica set, the replica set comprising a first unordered member and a second unordered member;

sending, by the first node, the IO request to the first member of the replica set and the second member of the replica set;

receiving, at the first node, IO responses from the first and second members of the replica set, a received IO response indicating a completion status of the IO request at the member of the replica set sending the IO response;

determining, at the first node, a successful completion of the IO request by the first and second members of the replica set;

sending, by the first node, an IO response to the application indicating successful completion of the IO request based on the first and second members of the replica set responding with an indication of successful completion of the IO request;

sending, by the first node, a request to the second node to modify the replica set based on an error response received from the first member for the IO request; and modifying the replica set based on an agreement of the first and second nodes of the node cluster.

13. The method of claim 12, further comprising:

sending by the second node of the node cluster, based on the request sent by the first node to the second node of the node cluster, a test IO operation to the first and second members of the replica set; and sending to the first node by the second node of the node cluster a message based on an outcome of the test IO operation.

14. The method of claim 12, wherein the distributed system further comprises a first object store and a second object store, and wherein the first and second members of the replica set are stored on one or more of the first and second object stores.

15. The method of claim 12, further comprising modifying, by the first node, the node cluster based on the second node of the node cluster sending an indication that the first member of the replica set is a good replica.

16. The method of claim 12, further comprising failing, by the first node, one or more IOs sent to the first member of the replica set.

17. The method of claim 12, wherein one or more members of the replica set with a successful indication based on the IO request comprise active members of the replica set, the method further comprising selecting an active member of the replica set as a master copy of the replica set based on a component failure of the distributed system.

* * * * *